Figure 1:
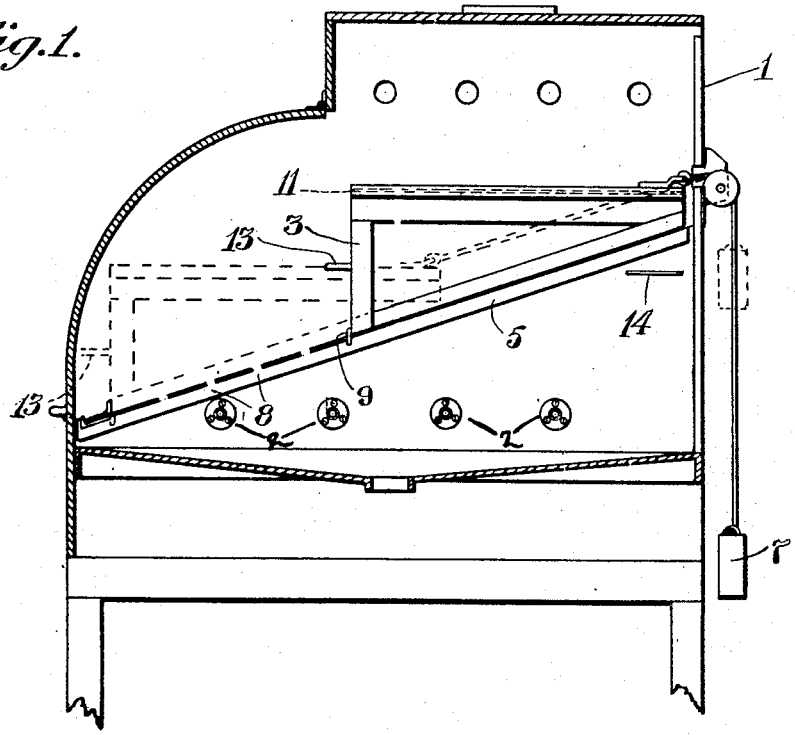

C. F. TERHUNE, DEC'D.
F. W. TERHUNE, ADMINISTRATRIX.
COOKING APPARATUS.
APPLICATION FILED MAY 7, 1912.

1,177,662.

Patented Apr. 4, 1916.

Attest:

Inventor:
Charles Frederick Terhune
by Jos. H. Freeman Atty

UNITED STATES PATENT OFFICE.

CHARLES FREDERICK TERHUNE, OF NEW YORK, N. Y.; FLORIDA W. TERHUNE, ADMINISTRATRIX OF SAID CHARLES FREDERICK TERHUNE, DECEASED, ASSIGNOR TO WILLIAM M. CRANE COMPANY, A CORPORATION OF NEW YORK.

COOKING APPARATUS.

1,177,662.      Specification of Letters Patent.      Patented Apr. 4, 1916.

Application filed May 7, 1912. Serial No. 695,707.

*To all whom it may concern:*

Be it known that I, CHARLES FREDERICK TERHUNE, a citizen of the United States, and a resident of New York, county and State of New York, have invented certain new and useful Improvements in Cooking Apparatus, of which the following is a specification.

The invention relates to cooking apparatus, and more particularly is directed to stoves using liquid or gaseous fuel.

Objects of the invention are to provide a cooking apparatus of the character referred to in which the support for the food to be cooked shall be movable easily and quickly into and out of the heat zone and in vertical and horizontal directions; in which the carriage or food support may be locked in different vertical and horizontal positions; and which shall be simple and economical in construction and highly efficient in operation.

These and other objects of the invention will be in part obvious and in part more fully explained in the following description.

The invention consists in the novel parts, improvements, combinations, and features of construction herein shown and described.

In the drawings, which are referred to herein and form part hereof, is illustrated an embodiment of the invention, the same serving in connection with the description herein to explain the principles of the invention.

Figure 2:
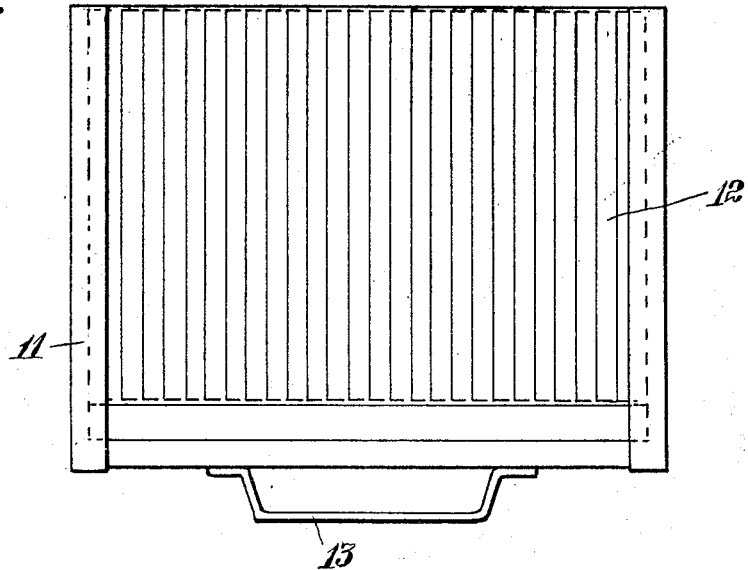

Of the drawings: Figure 1 is a vertical transverse section of a cooking apparatus constructed in accordance with the invention; and Fig. 2 is a plan view of a gridiron or broiler used in connection with the cooking apparatus.

A cooking apparatus constructed in accordance with certain principles of the invention includes in combination with a combustion chamber, a carriage movable vertically and horizontally therein, and means for guiding said carriage. In one embodiment of this feature of the invention said apparatus comprises a casing, a pair of inclined runways one on each of the opposite sides of said casing, and a carriage arranged to travel on said runways.

According to certain other features of the invention, means are provided for locking the carriage in different vertical and horizontal positions, said means in the above-mentioned embodiment comprising recesses formed in the runways and pawls on the carriage arranged and adapted to fit in the said recesses. According to still another feature of the invention, means are provided for assisting in moving said carriage on the runways, said means in said embodiment comprising a counterbalance connected to said carriage.

Referring now in detail to the drawings, the embodiment of the invention illustrated comprises a casing 1 having a combustion chamber arranged in the lower part thereof. While various kinds of fuel may be utilized, in the particular embodiment of the invention illustrated gas is employed for which burners 2 are provided.

A feature of the invention consists in providing means for moving the food to be cooked readily and easily into and out of the heat zone. While this may be done in various ways, preferably and as shown a carriage 3 is provided and the same is arranged to be moved vertically and also horizontally with reference to the burner on an inclined runway which, preferably, consists of two members 5 mounted one on each of the opposite sides of the casing. To assist in moving the carriage 3 on the runway a counterbalance 7 is suitably connected to the carriage and suspended in the rear of the casing 1. Suitably spaced recesses 8 are formed in the runways in which are engaged pawls 9 on the opposite sides of the carriage so that the latter may be held in a desired vertical position.

While the carriage may be of any suitable shape, preferably and as shown it is triangular in form so that the top will always be horizontal. The carriage is also hollow so that the heat may readily act upon the food supported by the carriage.

While the food to be cooked may be placed upon the carriage or in a container which is placed upon the carriage, in order to permit further horizontal adjustment of the food to be cooked at any of the vertical positions, grooves 11 are formed in the top of the carriage, in which grooves may slide any suitable device for holding the food to be cooked, as a gridiron 12 for broiling. When the carriage, which has a handle 13, is in its lowermost vertical position and the gridiron is pushed inwardly to its fullest extent, it may be desirable to support the gridiron, and for this purpose ledges 14 are suitably disposed on the side walls of the casing 1 on which ledges the gridiron may rest. The casing is provided with a suitable cover which may be hinged in any suitable way.

It will be seen that a cooking apparatus constructed in accordance with this invention permits many and fine adjustments between the food to be cooked and the source of heat; permits easy and safe handling of the food during the process of cooking, as broiling; and besides carrying out the objects of the invention, as heretofore enumerated, possesses other advantages which will be apparent to those skilled in the art.

The invention in its broader aspects is not limited to the particular construction illustrated and described, as many changes may be made in the details thereof without departing from the main principles of the invention or sacrificing its chief advantages.

I claim:

1. A stove including in combination, a casing, an inclined support permeable to heat arranged therein, a burner arranged beneath said support, a grid, a carriage for said grid slidably arranged on said support, whereby the movement of the carriage on its support will change its position both vertically and horizontally toward or from the heating zone, as desired, and means for maintaining the carriage in any adjusted position.

2. A stove including in combination, a casing, a pair of inclined runways arranged one on each of the opposite inner sides of said casing, a burner arranged beneath said runways, a grid, and a carriage for said grid slidably arranged on said runways and bridging the open space therebetween, whereby the movement of the carriage on its runways will change its position both vertically and horizontally toward or from the heating zone, as desired.

3. A stove including in combination, a casing, a pair of inclined runways arranged one on each of the opposite inner sides of said casing, a plurality of burners arranged beneath said runways, a grid, and a carriage for said grid slidably arranged on said runways and bridging the open space therebetween, whereby the movement of the carriage on its runways will change its position both vertically and horizontally toward or from the heating zone, as desired.

4. A stove including in combination, a casing, an inclined support permeable to heat arranged therein, a burner arranged beneath said support, a carriage permeable to heat slidably arranged on said support so that its movement on its support will change its position both vertically and horizontally toward or from the heating zone, as desired, and a grid slidably arranged on said carriage and maintained in a horizontal plane, whereby at any distance vertically from the heat zone the amount of material within the heat zone may be varied.

5. A stove including in combination, a casing, a pair of inclined runways arranged on inner sides of said casing, a plurality of burners arranged beneath said runways, a carriage permeable to heat slidably arranged on said runways so that its movement on the runways will change its position both vertically and horizontally toward or from the heating zone as desired, and a grid slidably arranged on said carriage and maintained in a horizontal plane, whereby at any given distance vertically from the heat zone the amount of material within the heat zone of any given number of burners may be varied.

6. A stove including in combination, a casing, a pair of inclined runways permeable to heat arranged on opposite inner sides of said casing, a plurality of burners arranged beneath said runways, a grid, a carriage for said grid slidably arranged on said runways so that its movement on said runways will change its position both vertically and horizontally toward or from the heating zone as desired, and means for locking said carriage in its different adjusted positions.

7. A stove including in combination, a casing, a pair of inclined runways permeable to heat arranged on opposite inner sides of said casing, a plurality of burners arranged beneath said runways, a grid, a carriage for said grid slidably arranged on said runways so that its movement on said runways will change its position both vertically and horizontally toward or from the heating zone as desired, and means acting as a counterbalance for said carriage.

8. A stove including in combination, a casing, a pair of inclined runways permeable to heat arranged on opposite inner sides of said casing, a plurality of burners arranged beneath said runways, a grid, a carriage for said grid slidably arranged on said runways so that its movement on said runways will change its position both vertically and horizontally toward or from the heating zone as desired, means for locking said carriage in its different adjusted positions, and means acting as a counterbalance for said carriage.

9. In a cooking apparatus, the combination of a combustion chamber, a rigid carriage movable up and down diagonally therein, and means for guiding said carriage, and for holding it in any adjusted position.

10. In a cooking apparatus, the combination of a combustion chamber, a rigid carriage movable up and down diagonally to different operative positions within said chamber, means for guiding said carriage, and means acting as a counterbalance for said carriage.

11. In a cooking apparatus, the combination of a combustion chamber, a carriage movable up and down diagonally to different operative positions within said chamber, means acting as a counterbalance for said carriage, means for guiding said carriage, and means for locking said carriage in its different operative positions.

In testimony whereof, I have signed my name to this specification, in the presence of two subscribing witnesses.

CHARLES FREDERICK TERHUNE.

Witnesses:
Wm. M. Crane,
E. W. Weber.